United States Patent
Hashimoto

[11] Patent Number: 5,924,944
[45] Date of Patent: Jul. 20, 1999

[54] PULLEY STRUCTURE OF CONTINUOUSLY VARIABLE TRANSMISSION

[75] Inventor: Takenori Hashimoto, Tokyo, Japan

[73] Assignee: Fuji Jukogyo Kabushiki Kaisha, Tokyo, Japan

[21] Appl. No.: 08/779,672

[22] Filed: Jan. 7, 1997

[30] Foreign Application Priority Data

Feb. 15, 1996 [JP] Japan ................................. 8-027790

[51] Int. Cl.$^6$ ............................ F16H 55/56; F16H 59/00
[52] U.S. Cl. .................................. 474/18; 474/8; 474/17; 474/24
[58] Field of Search .................................. 474/18, 8, 17, 474/24

[56] References Cited

U.S. PATENT DOCUMENTS

| | | | |
|---|---|---|---|
| 4,716,791 | 1/1988 | Ohzono et al. | 474/18 X |
| 5,342,247 | 8/1994 | Adriaenssens | 474/18 X |
| 5,439,419 | 8/1995 | Yamada et al. | 474/18 |
| 5,462,035 | 10/1995 | Teraoka et al. | 474/18 X |
| 5,676,612 | 10/1997 | Schellekens et al. | 474/18 |

FOREIGN PATENT DOCUMENTS

| | | | |
|---|---|---|---|
| 479733 | 12/1992 | Japan . | |
| 2080892 | 2/1982 | United Kingdom | 474/18 |

Primary Examiner—John J. Calvert
Assistant Examiner—Gary L. Welch
Attorney, Agent, or Firm—Martin A. Farber

[57] ABSTRACT

A pulley assembly of a belt type continuously variable transmission having a stationary sheave, a moving sheave and a hydraulic actuator connected at an edge thereof with the moving sheave for controlling a groove width between the stationary sheave and the moving sheave comprises, an annular groove provided at the back face of the moving sheave and an annular projection provided on the bottom surface of the annular groove for regulating a plastic flow of the edge into a fork-shape when the edge is caulked into the annular groove. Thus constituted structure of the pulley assembly provides an enough connecting strength between the hydraulic actuator and the moving sheave with a small amount of caulking.

13 Claims, 6 Drawing Sheets

PULLEY STRUCTURE OF CONTINUOUSLY VARIABLE TRANSMISSION

BACKGROUND OF THE INVENTION

1. Field of the Invention

The present invention relates to a pulley structure of a belt type continuously variable transmission and a method of coupling its moving sheave with a hydraulic actuator member thereof.

2. Prior Art

A belt type continuously variable transmission comprises a primary (driving) shaft, a secondary (driven) shaft provided in parallel with the primary shaft, a primary pulley fixed on the primary shaft, a secondary pulley mounted on the secondary shaft and a driving belt looped over both pulleys, thereby the speed of the secondary shaft can be varied continuously by changing a ratio of running diameters between both pulleys. The ratio of running diameters is changed by regulating a groove width of the both pulleys respectively.

In this type of the continuously variable transmission, as shown in FIG. 6, one pulley assembly, for example, the primary pulley comprises a shaft 11, a stationary sheave 10 rigidly mounted on the shaft 11, a boss 21 coaxially coupled with the shaft 11 so as to be axially displaceable thereon, a moving sheave 20 rigidly mounted on the boss 21, a plurality of ball grooves 11a and 21a provided on the shaft 11 and boss 21 respectively and balls provided between ball grooves 11a and 21a so as to displace the boss 21 along the shaft 11 smoothly. Thus, a groove is formed between the stationary sheave 10 and the moving sheave 20.

The groove width L is controlled by a hydraulic actuator 30 which comprises a piston 31 fixed to the moving sheave 20 at the back side thereof and a cylinder 35 connected with the stationary sheave 10. When hydraulic fluid is supplied to the hydraulic actuator 30, the moving sheave 20 is slid on the shaft 11 of the stationary sheave 10 by the hydraulic actuator 30 so as to regulate the groove width L.

Because of this, it is necessary to secure a strong connecting structure with adequate pressure proof between the moving sheave 20 and the piston 31. Japanese Utility Model Application Laid-open No. Jitsu-Kai-Hei 3-114657 discloses a technique in which, as shown in FIGS. 7 and 8, an end portion of the piston 31 is caulked into an annular groove 23 provided on the back face of the moving sheave 20 so as to rigidly connect the piston 31 with the moving sheave 20.

Further, Japanese Examined Patent Application No. Toku-Ko-Hei 4-79733 discloses a method in which a roller is pressed on the outer periphery surface of the piston while the piston is being rotated integrally with the moving sheave so as to apply a caulking connection between the piston and the moving sheave.

Generally, the connecting strength between the moving sheave 20 and the piston 31 is proportional to the contact area between the annular groove 23 formed on the back face of the moving sheave 20 and the caulking portion of the piston 31. However, according to this prior art, the plastic flow portion of the end of the piston 31 has a U-shaped cross section as illustrated in FIG. 9 and consequently a sufficient contact area can not be obtained between the annular groove 23 and the piston 31. On the other hand, when a greater force is applied to a roller 45 in order to enlarge the contact area by increasing the amount of caulking, the end portion 31a of the piston 31 is excessively deformed and finally exceeds a plastic limit, leading to a production of cracks and furrowings therein. The cracks and furrowings cause not only a lack of strength but also a leakage of hydraulic fluid from inside of the hydraulic actuator 30.

SUMMARY OF THE INVENTION

Accordingly, the present invention is intended to obviate the disadvantages of this prior art and it is an object of the present invention to provide a pulley structure of a belt type continuously variable transmission capable of securing an adequate and stable connecting strength between the moving sheave and the hydraulic actuator.

In order to achieve the object, the pulley structure according to the present invention comprises:

an annular groove provided at the back face of a moving sheave; and an annular projection provided on the bottom surface of the annular groove for regulating a plastic flow of the edge of the hydraulic actuator when the edge is caulked into the annular groove.

DETAILED DESCRIPTION OF PREFERRED EMBODIMENTS

Figure 1:
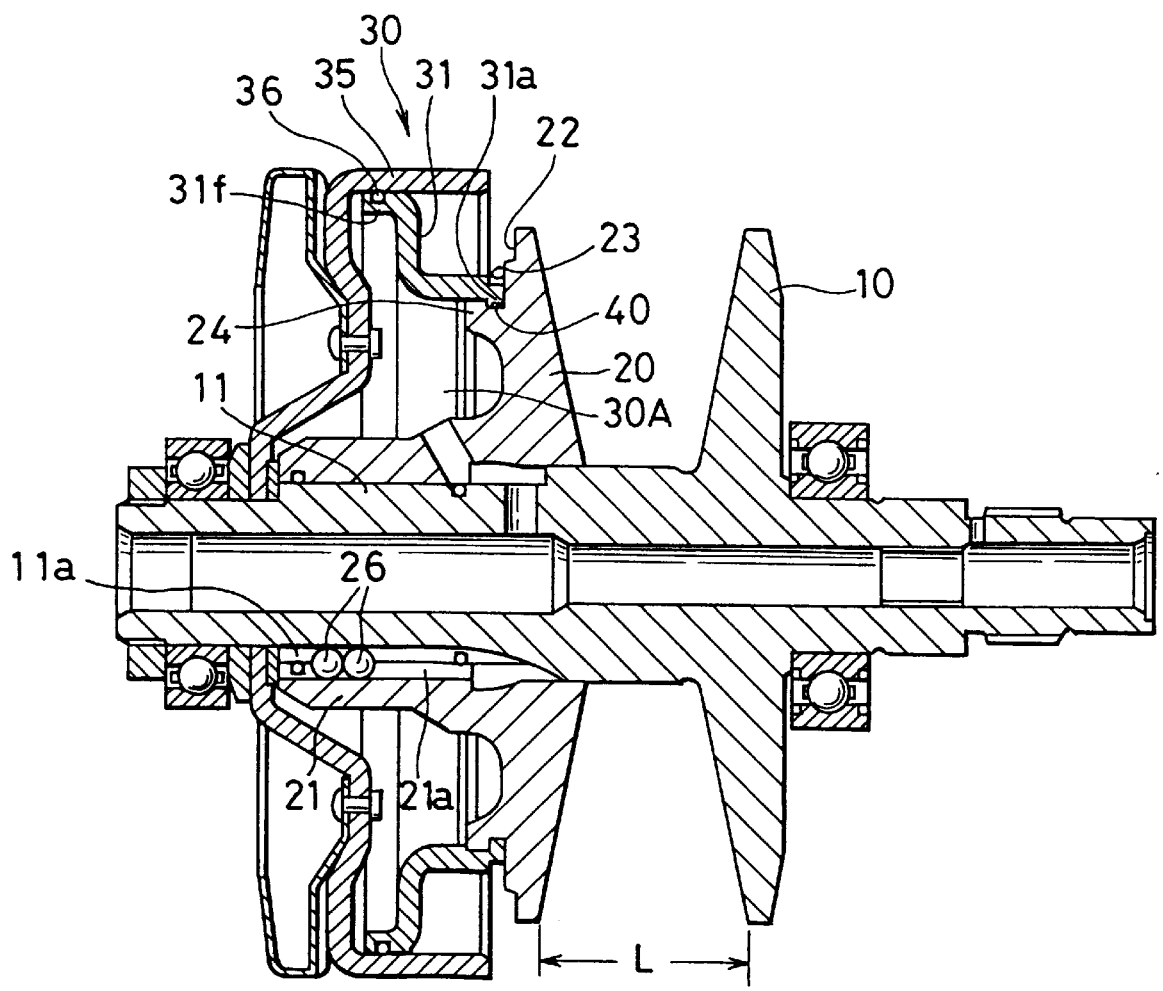
FIG. 1 is a sectional view of a primary pulley for a belt type continuously variable transmission according to a first embodiment of the present invention.

Referring now to FIG. 1, a primary pulley comprises a stationary sheave 10 and a moving sheave 20 and it is driven by an engine through a clutch and the like. A drive belt is looped over the pulley formed of the stationary sheave 10 and the moving sheave 20 with a certain cramping force for transmitting torque. To smoothly control the groove width L between the stationary sheave 10 and the moving sheave 20, there are provided a plurality of ball grooves 11a and 21a on a shaft 11 of the stationary sheave 10 and on a boss 21 of the moving sheave 20 respectively and further provided balls 26 in the ball grooves 11a and 21a. The boss 21 of the moving sheave 20 is coaxially coupled with the shaft 11 of the stationary sheave 10 through the balls 26 so as to travel freely in the axial direction on the shaft 11.

A cylindrical piston 31 is mounted on the back face 22 of the moving sheave 20 and a cylinder 35 is fixed at the center portion thereof on the shaft 11 of the stationary sheave 10. This piston-cylinder unit forms a hydraulic actuator 30 for controlling the groove width L of the pulley. That is to say, the moving sheave 20 is displaced axially on the shaft 11 of the stationary sheave 10 by charging or discharging hydraulic fluid to or from a hydraulic chamber 30A so as to continuously control the groove width L of the pulley formed of the two sheaves 10 and 20. Numeral 36 denotes a seal provided in a groove 31f formed on the outer periphery surface of the piston 31 for sealing the sliding surface between the piston 31 and the cylinder 35.

Figure 2:
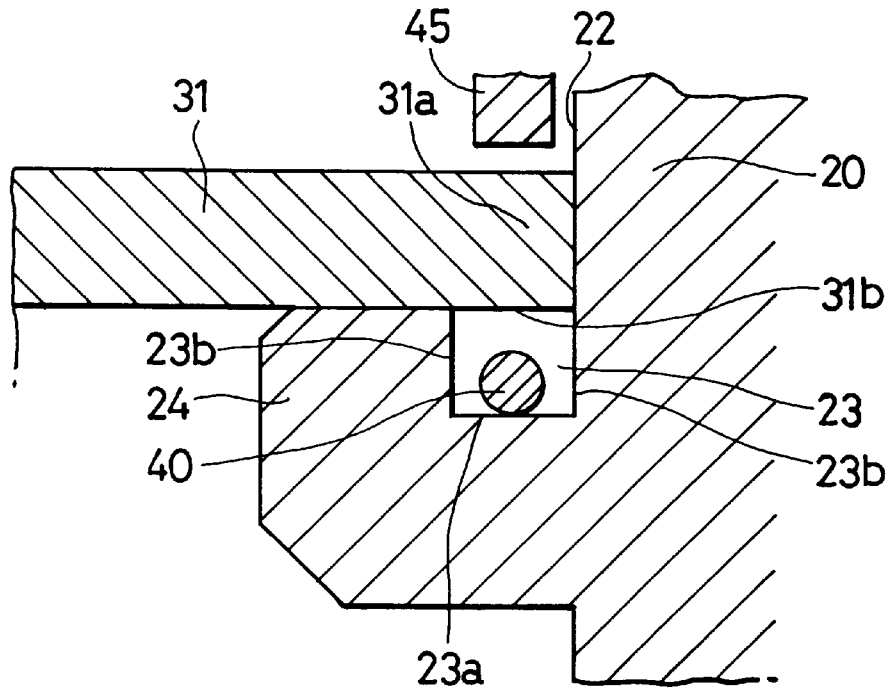
FIG. 2 is a sectional view of a caulking connection between a moving sheave and a piston before caulking according to a first embodiment.

Referring to FIG. 2, a flange 24 having an annular groove 23 is provided on the back face 22 of the moving sheave 20 and a steel wire 40 is wound around the annular groove 23 on its bottom surface 23a. Further, the piston 31 is fit on the outer peripheral surface of the flange 24 with its end portion (edge) 31a contacting the back face of the moving sheave 20.

In this state, a roller 45 presses the end portion 31a of the piston 31 into the annular groove 23, while the piston 31 is rotated about the center axis of the boss 21 integrally with the moving sheave 20 so as to caulk the end portion 31a into the annular groove 23, thus a rigid and integral connection being obtained between the piston 31 and the moving sheave 20.

Figure 3:
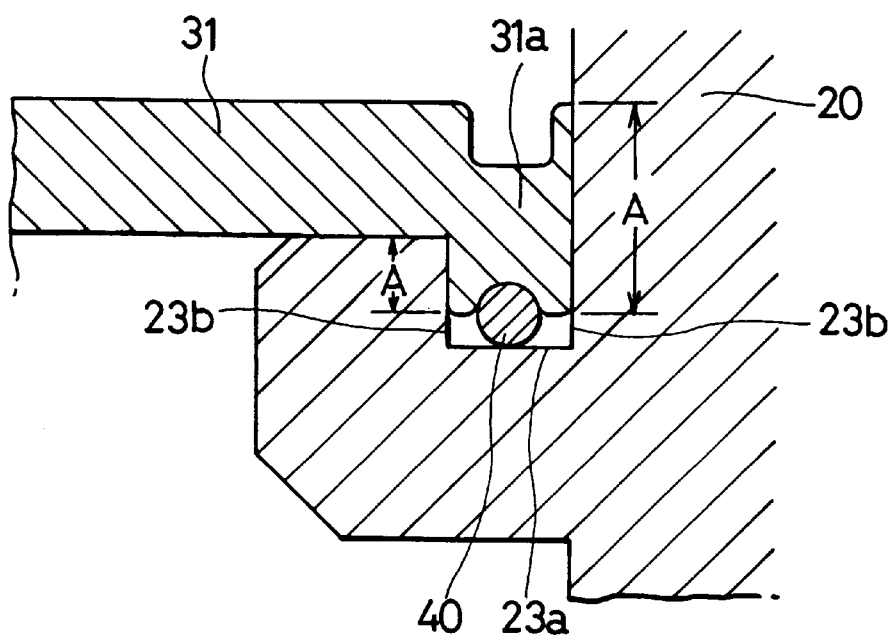
FIG. 3 is a sectional view of a caulking connection between a moving sheave and a piston after caulking according to a first embodiment.
Figure 9:
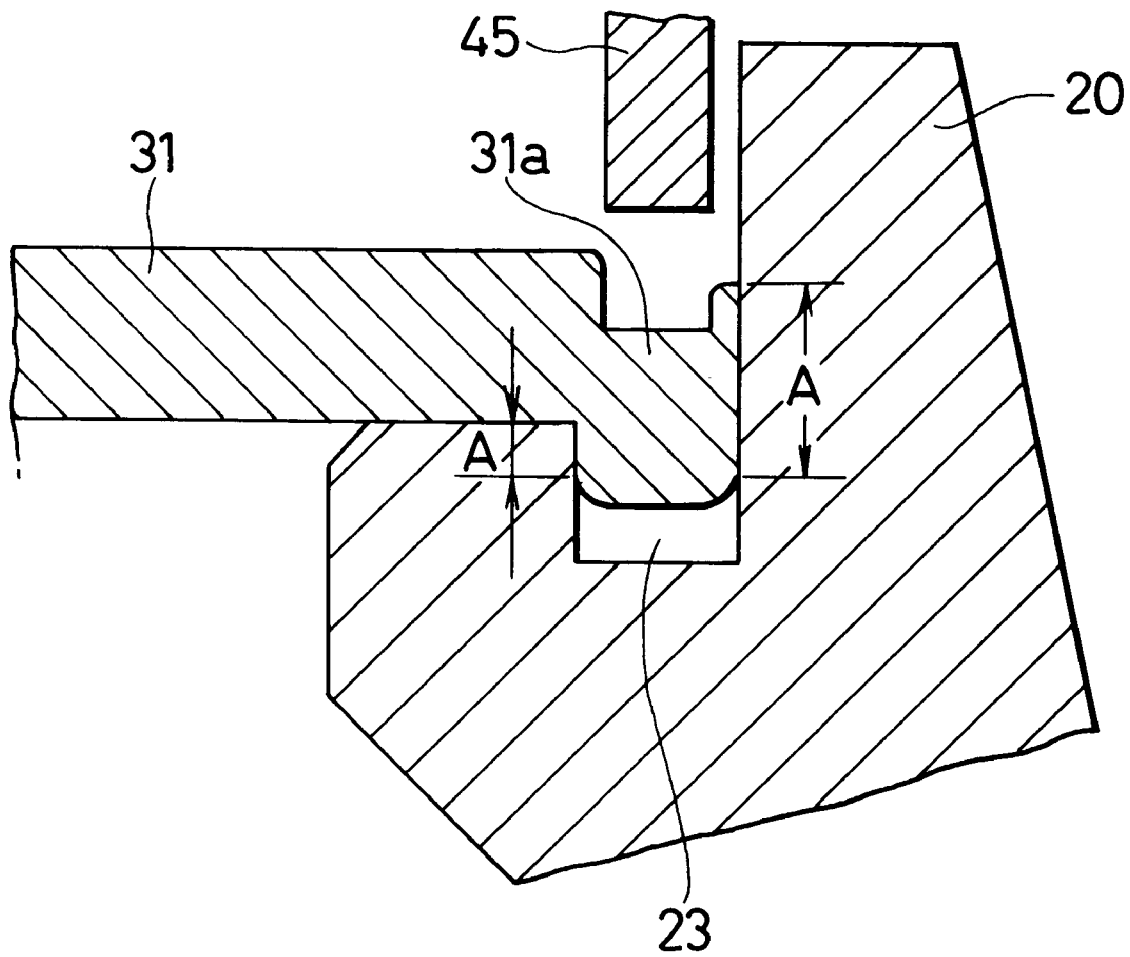
FIG. 9 is a sectional view of a caulking connection between a mowing sheave and a piston after caulking according to a prior art.

When the end portion 31a of the piston 31 is pressed into the annular groove 23, its plastic flow is restricted by the steel wire 40 and as a result the end portion 31a is deformed into a fork-shape as shown in FIG. 3. Thus the obtained caulking portion has a larger contact area A on the sides 23b of the annular groove 23 compared to when the steel wire is not used (cf. FIGS. 3 and 9), this being able to secure sufficient strength in the caulking portion even with a smaller caulking amount. The smaller amount of caulking also brings such advantages that cracks or furrowings can be avoided and further the force to be applied to the roller 45 can be reduced.

Figure 4:
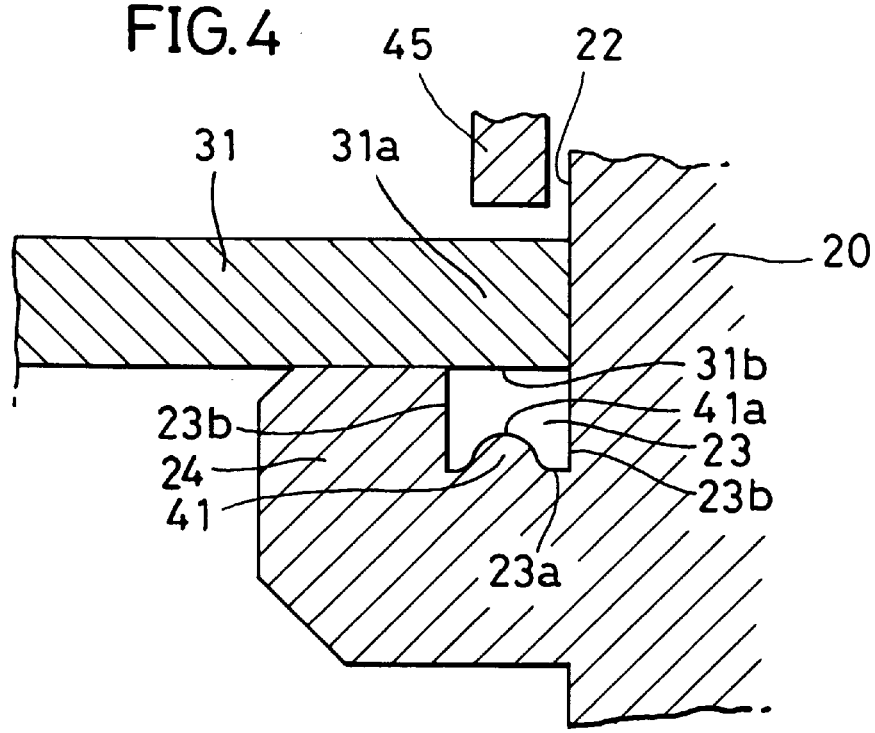
FIG. 4 is a sectional view of a caulking connection between a moving sheave and a piston before caulking according to a second embodiment of the present invention.
Figure 5:
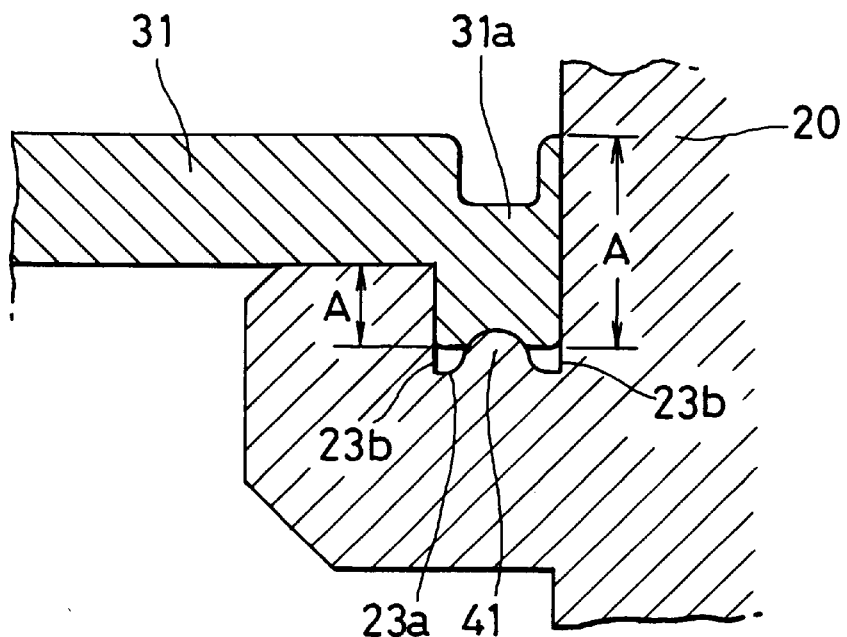
FIG. 5 is a sectional view of a caulking connection between a moving sheave and a piston after caulking according to a second embodiment.
Figure 6:
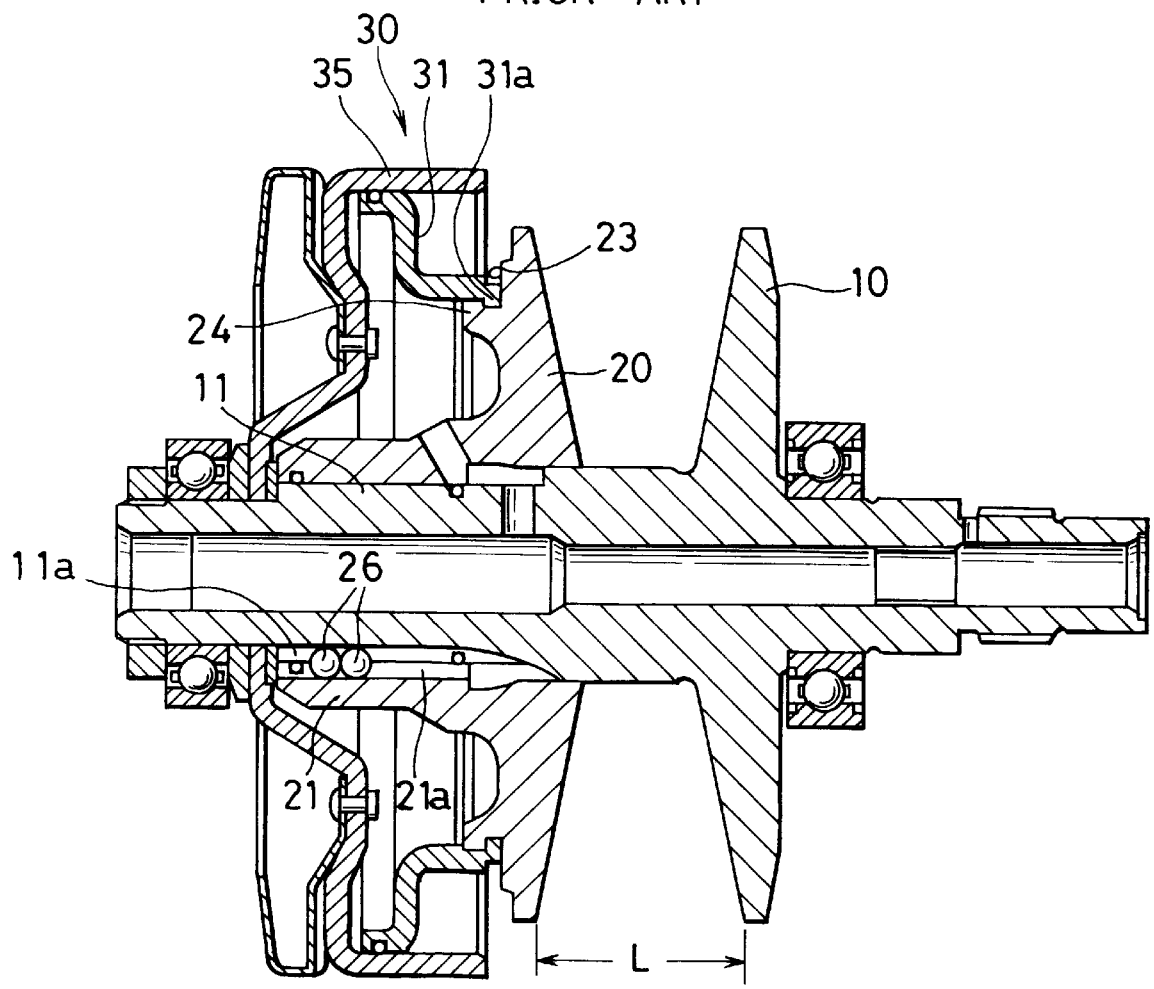
FIG. 6 is a sectional view of a primary pulley according to a prior art.
Figure 7:
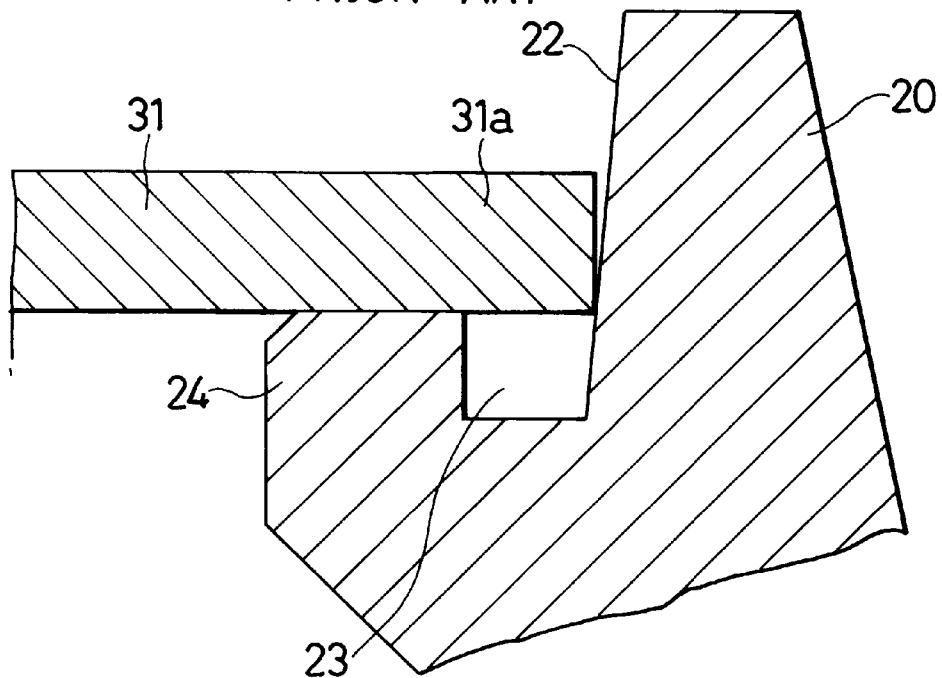
FIG. 7 is a sectional view of a caulking connection between a moving sheave and a piston before caulking according a prior art.
Figure 8:
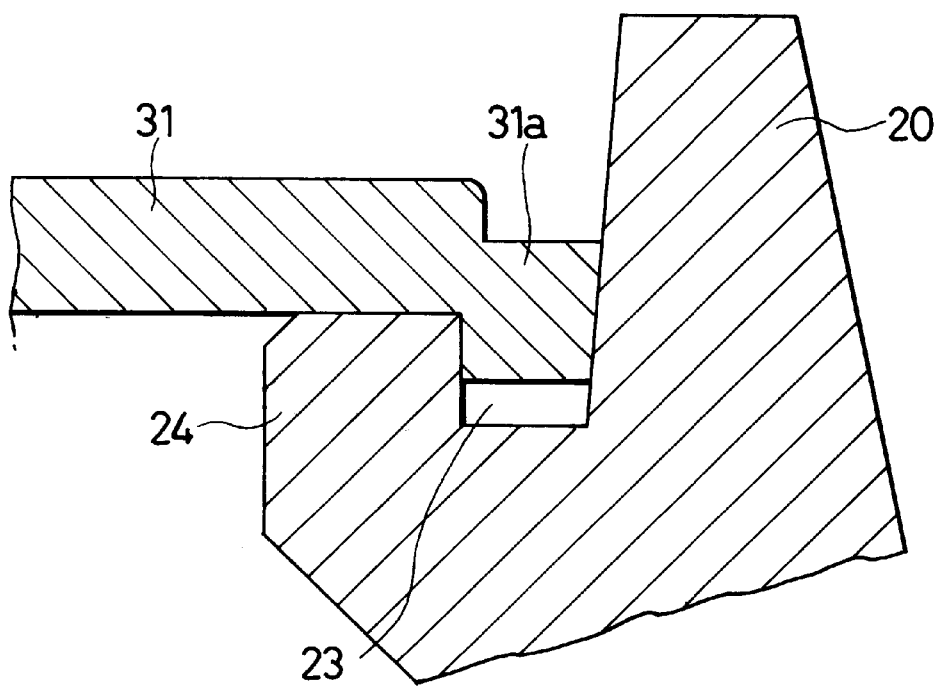
FIG. 8 is a sectional view of a caulking connection between a moving sheave and a piston after caulking according to a prior art.

FIG. 4. and FIG. 5 show another method of connecting the moving sheave with the piston.

FIG. 4 illustrates a state where the piston 31 is not yet subjected to the caulking connection with the moving sheave 20. The flange 24 having an annular groove 23 is formed at the back face of the moving sheave 20. The bottom portion 23a of the annular groove 23 is provided with an annular projection 41 protruded in the radial direction and formed integrally therewith.

In this state of the piston 31 and the moving sheave 20, the roller 45 presses the end portion (edge) 31a of the piston 31 into the annular groove 23, while the piston 31 is rotated about the center axis of the boss 21 integrally with the moving sheave 20 so as to caulk the end portion 31a into the annular groove 23, thus a rigid connection being obtained between the piston 31 and the moving sheave 20.

When the end portion 31a of the piston 31 is pressed into the annular groove 23, its plastic flow is restricted by the surface 31b of the end portion 31a engaging the surface 41a of the annular projection 41 and as a result the end portion 31a is deformed into a fork-shape as shown in FIG. 5. Thus the obtained caulking portion has a large contact area A on the sides 23b of the annular groove 23 sufficient to secure a strength in the caulking portion even with a smaller caulking amount. The smaller amount of caulking also brings such advantages that cracks or furrowings can be prevented from being produced and further the applied force to the roller 45 can be reduced.

The caulking methods described above may be applied to the secondary pulley or to a case where the cylinder is connected with the stationary sheave.

In summary, according to the present invention, in connecting the piston with the moving sheave of the pulley assembly of the continuously variable transmission, a plastic flow restricting projection provided at the bottom of the annular groove serves as enlarging a contact area between the piston and the moving sheave by deforming a caulking portion of the piston into a fork-shape, whereby the connecting strength of the piston and the moving sheave can be enhanced with a small amount of caulking.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A pulley assembly of a type continuously variable transmission having an axially stationary sheave, an axially moving sheave forming a belt groove with said stationary sheave having different width in a radial direction, a pulley belt disposed in said belt groove, and a hydraulic actuator connected at an edge thereof with said moving sheave for controlling axial movement of said moving sheave so as to vary the width of said belt groove and a running diameter of said belt, comprising:

an annular groove provided at a back portion of said moving sheave, said back portion being on a side of said moving sheave facing away from said belt groove;

an annular projection provided on a bottom surface of said annular groove; and said edge of said hydraulic actuator is deformed in said annular groove directly and entirely covering a radially outward surface of said annular projection by a plastic deformation of said edge with said edge being caulked into said annular groove.

2. The pulley assembly according to claim 1, wherein said annular projection is a steel wire wound about said annular groove.

3. The pulley assembly according to claim 1, wherein said annular projection is integrally formed in one piece with said annular groove.

4. A pulley assembly according to claim 1, wherein said deformed edge is fork-shaped in cross-section adjacent the bottom surface of said annular groove.

5. A method of connecting a hydraulic actuator at an edge thereof with a moving sheave of a belt type continuous variable transmission having an axially stationary sheave, an axially moving sheave forming a belt groove with said stationary sheave, a pulley belt disposed in said belt groove, and a hydraulic actuator connected at an edge thereof with said moving sheave for controlling axial movement of said moving sheave so as to vary the width of said belt groove, the method comprising the steps of:

providing an annular groove at a back portion of said moving sheave, said back portion being on a side of said moving sheave facing away from said belt groove;

providing an annular projection on a bottom surface of said annular groove; and regulating a plastic flow of said edge by caulking said edge into said annular groove so as to deform said edge into said annular groove directly and entirely covering a radially outward surface of said annular projection.

6. A method of connecting a hydraulic actuator with a moving sheave according to claim 5, wherein said step of providing said annular projection comprises winding a wire in said annular groove as said annular projection.

7. A method of connecting a hydraulic actuator with a moving sheave according to claim 5, wherein said step of providing said annular projection comprises forming an integral projection in one piece with said moving sheave in said annular groove as said annular projection.

8. A method of connecting a hydraulic actuator with a moving sheave according to claim 5, wherein said regulating step comprises pressing a roller radially inwardly, deforming said edge into said annular groove.

9. A method of connecting a hydraulic actuator with a moving sheave according to claim 5, wherein said edge is deformed fork-shaped.

10. A primary pulley assembly of a continuously variable transmission having a stationary sheave formed on a shaft for receiving one side of a belt, a movable sheave coaxially mounted on said shaft axially slidable thereon and for receiving another side of said belt, said sheaves having respective belt receiving sides facing each other, and a hydraulic actuator connected to said movable sheave for pushing a back side thereof for changing a width of said belt receiving sides between said stationary sheave and said movable sheave, comprising:

a cylinder coaxially and liquid-tightly connected to said shaft forming a hydraulic chamber of oil and rotatable with and at a same speed as that of said shaft;

a piston member axially displaceably disposed in said cylinder and connected to said movable sheave for axially moving in said cylinder with said movable sheave;

a circular flange portion formed on a back face of said movable sheave facing away from said belt receiving side of said movable sheave, said flange portion protruding in an axial direction and having an annular groove;

an annular projection formed in said annular groove of said circular flange portion and projecting in a radial direction with respect to said annular groove; and an edge formed at an end of said piston member and being deformed in said groove rigidly and liquid-tightly connecting said movable sheave and said piston member by directly and substantially entirely radially outwardly covering said annular projection by a plastic deformation of said edge, thereby avoiding cracks and furrowings due to pressure higher than that of ordinary pressure by a caulking operation, and obtaining optimum liquid-tightness.

11. A primary pulley assembly according to claim 10, wherein said deformed edge is a fork-shaped in cross-section adjacent a bottom surface of said annular groove.

12. A primary pulley assembly of a continuously variable transmission having a stationary sheave formed on a shaft for receiving one side of a belt, a movable sheave coaxially mounted on said shaft axially slidable thereon and for receiving another side of said belt, said sheaves having respective belt receiving sides facing each other, and a hydraulic actuator connected to said movable sheave for pushing a back side thereof for changing a width of said belt receiving sides between said stationary sheave and said movable sheave, comprising:

a cylinder coaxially and liquid-tightly connected to said shaft forming a hydraulic chamber of oil and rotatable with and at a same speed as that of said shaft;

a piston member axially displaceably disposed in said cylinder and connected to said movable sheave for axially moving in said cylinder with said movable sheave;

a circular flange portion formed on a back face of said movable sheave facing away from said belt receiving side of said movable sheave, said flange portion protruding in an axial direction and having an annular groove;

a steel wire wound in said annular groove of said circular flange portion and projecting in a radial direction with respect to said annular groove; and an edge formed at an end of said piston member and being deformed in said groove rigidly and liquid-tightly connecting said movable sheave and said piston member by directly and substantially entirely radially outwardly covering said steel wire by a plastic deformation of said edge, thereby avoiding cracks and furrowings due to pressure higher than that of ordinary pressure by a caulking operation, and obtaining optimum liquid-tightness.

13. A primary pulley assembly according to claim 12, wherein said deformed edge is fork-shaped in cross-section adjacent a bottom surface of said annular groove.

* * * * *